United States Patent Office 3,450,105
Patented June 17, 1969

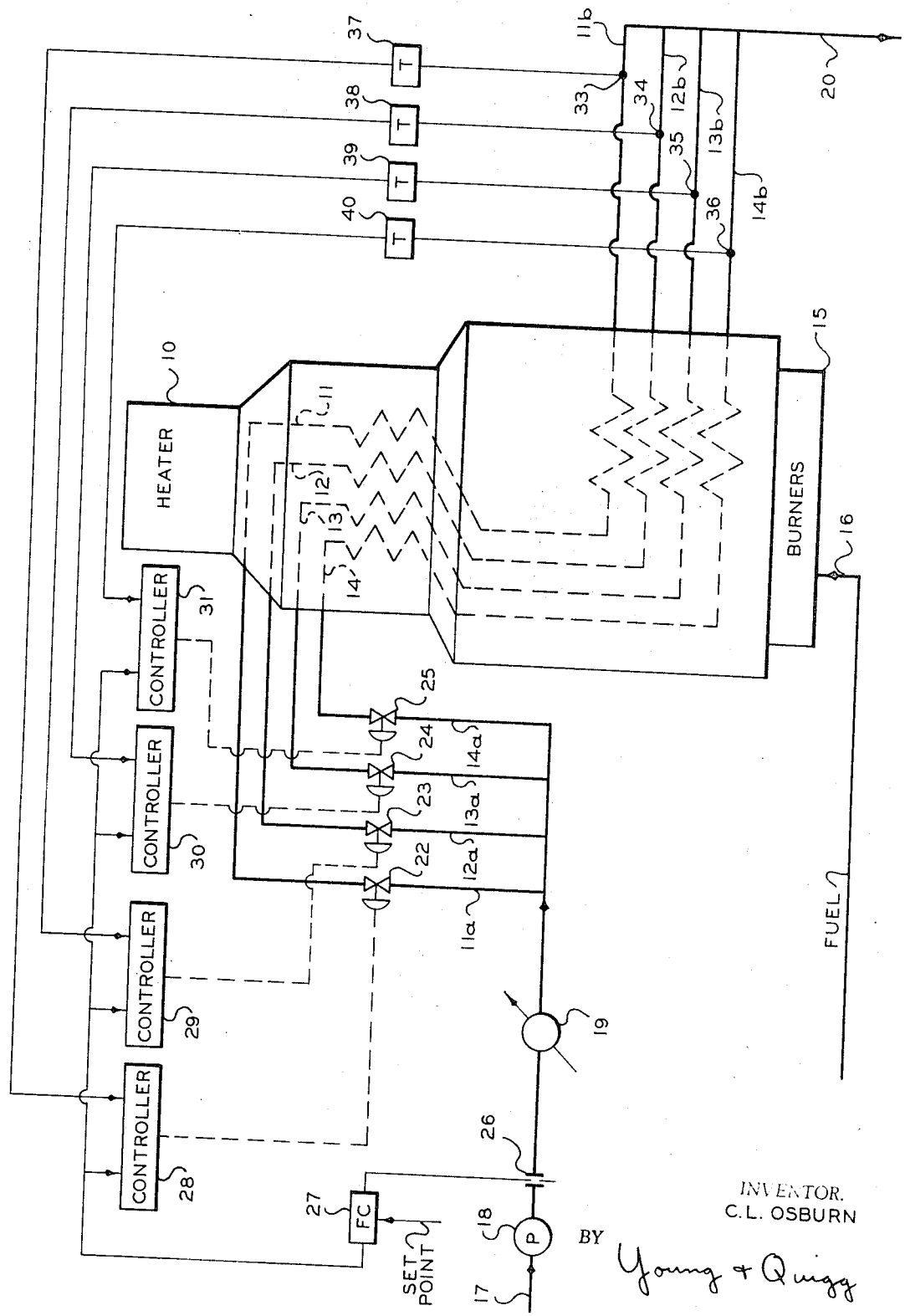

3,450,105
TEMPERATURE BALANCING OF MULTIPASS HEAT EXCHANGER FLOWS
Carl L. Osburn, Bartlesville, Okla., assignor to Phillips Petroleum Company, a corporation of Delaware
Filed June 19, 1967, Ser. No. 646,885
Int. Cl. G05d 23/00; F22d 5/26
U.S. Cl. 122—451         7 Claims

ABSTRACT OF THE DISCLOSURE

Temperatures of effluent streams from a multipass heat exchanger are equalized by measuring the inlet flow rate and effluent temperatures and adjusting the individual flow rates in response to the measured values.

---

This invention relates to the control of fluid flow through multipass heat exchangers.

It is common practice in various petroleum and chemical operations to heat liquids by use of multipass heaters. A plurality of parallel coils are disposed in the heater to receive the liquid to be heated. The inlet flow of liquid is divided to flow through the separate coils, and the output flows from the coils are recombined by subsequent processing. Heaters of this type are often used, for example, in heating crude oil for introduction into a distillation column. It is generally desirable to heat the liquid in each coil to the desired heater outlet temperature in order to provide the most efficient operation and to be assured that the final blend is at the desired temperature.

In accordance with this invention, a procedure is provided for controlling multipass heat exchangers in such a manner that the outlet temperatures of the individual flows are maintained uniform. This is accomplished by establishing a first signal which is representative of the rate of flow of fluid passed to the heat exchanger. Individual control valves are provided in each of the parallel flow paths. The temperatures of the plurality of effluent streams from the heat exchanger are also measured. These temperature signals are combined individually with the common flow signal so as to regulate each of the flows through the individual coils in such a manner as to maintain the outlet temperatures of the fluids passed through the coils relatively constant.

Accordingly, it is an object of this invention to provide an improved method for controlling the operation of multipass heat exchangers.

Another object is to provide a control system for use in regulating the rates of flow of fluids through a multipass heat exchanger.

Other objects, advantages and features of the invention should become apparent from the following detailed description, taken in conjunction with the accompanying drawing which illustrates schematically an embodiment of the control system of this invention.

Referring now to the drawing in detail, there is shown a heater 10 which is provided with a plurality of coils 11, 12, 13 and 14. Heat is supplied to the heater by a plurality of burners 15 which receive fuel from a conduit 16. Coils 11 to 14 extend in parallel through the heater and are arranged so as to receive heat generated by burners 15. Heaters of this type are commonly employed to heat liquids such as crude oil.

The liquid to be heated is introduced into the system through a conduit 17 which has an inlet pump 18 therein. One or more preliminary heat exchangers 19 can be disposed in conduit 17 upstream from heater 10, if desired. Parallel branch conduits 11a, 12a, 13a and 14a extend between conduit 17 and the inlets of respective heater coils 11, 12, 13 and 14. Parallel conduits 11b, 12b, 13b and 14b communicate with the respective outlets of coils 11, 12, 13 and 14 to remove heated oil from the heater. Conduits 11b, 12b, 13b and 14b communicate with a common outlet conduit 20 which removes the heated oil to a subsequent processing unit, such as a distillation column.

The flows through the individual coils of heater 10 are regulated by control valves 22, 23, 24 and 25 which are disposed in respective conduits 11a, 12a, 13a and 14a. The rate of liquid flow through conduit 17 is measured by a flow transducer 26 disposed in the conduit. A flow controller 27 is connected to this transducer and, upon receiving a set point representing desired flow rate, serves to establish an output signal which can be used to control the total rate of flow of liquid through conduit 17 by direct or indirect manipulation of all or part of this flow. This output signal is applied as the set point signal to individual controllers 28, 29, 30 and 31. Temperature sensing transducers 33, 34, 35 and 36 are associated with respective outlet conduits 11b, 12b, 13b and 14b to establish signals representative of the temperatures of fluid flowing through the respective conduits. These signals are applied to respective transmitters 37, 38, 39 and 40 which send signals representative of the measured temperatures to the inputs of respective controllers 28, 29, 30 and 31. The output signals from controllers 28, 29, 30 and 31 are applied to respective control valves 22, 23, 24 and 25 to adjust the openings of the valves, and thus the flows through conduits 11a, 12a, 13a and 14a.

In the apparatus thus far described, flow controller 27 provides an output signal which is representative of the deviation between the rate of flow of liquid through conduit 17 and its set point desired value. If it is desired that this flow should increase, it is evident that the individual control valves must be opened to accommodate the greater individual flows. The output signal from controller 27 is applied as the set point signal to controllers 28 to 31. The set points of the controllers are thus varied in response to changes in total flow into the system. The signals from transmitters 37 to 40 are applied as the normal input measurement signals to respective controllers 28 to 31. If an individual coil's measured temperature should decrease, for example, the flow rate through the coil is decreased to provide a greater residence time for that liquid in the heating zone. Conversely, an increase in temperature results in a greater flow rate. In this manner, the temperatures of the individual outlet liquid streams tend to remain uniform. Adjustment of fuel rate is contemplated so as to produce the desired total heated oil temperature.

In another embodiment of this invention, elements 37 to 40 can be conventional temperature controllers in place of mere temperature transmitters. In this embodiment, controllers 28 to 31 can be adding relays which serve to combine the two input signals to provide a final output control signal to the individual valves.

In one specific embodiment of the process being controlled by this invention, crude oil is introduced into the system through conduit 17 at a rate of approximately 725 gallons per minute. This oil is at a temperature of about 240° F. Conduit 17 is a six inch line. The oil is elevated in temperature after passing through a series of heat exchangers 19 to a temperature of about 490° F. Conduits 11a to 14a are four inch lines which communicate with five inch coils within heater 10. Conduits 11b to 14b are eight inch lines which communicate with a 14 inch outlet line 20. The oil is heated in heater 10 to an outlet temperature of approximately 760° F. This common outlet temperature is maintained in each of conduits 11b to 14b by the control system described.

While this invention has been described in conjunction with presently preferred embodiments, it should be evident that it is not limited thereto. For example, the system can be employed in conjunction with a cooler wherein it is desired to cool a feed stream in a multi-pass heat exchanger and provide individual outlet streams at a common temperature.

What is claimed is:

1. In a system wherein a heat exchanger is provided with a plurality of first conduit means extending in parallel relationship therethrough, and an inlet conduit means communicates with the inlet ends of each of said first conduit means so as to divide and direct an inlet fluid stream through said plurality of first conduit means; a control system comprising fluid flow measuring means associated with said inlet conduit means to measure the rate of flow of fluid therethrough and establish a first signal representative of such rate of flow; a plurality of temperature sensing means, each associated with a respective one of said first conduit means adjacent the outlet end thereof, to measure the temperatures of fluids in each of said first conduit means after passage through said heat exchanger and establish a plurality of second signals representative of respective ones of such temperatures; a plurality of control valves, one in each of said first conduit means; a plurality of control means, the output of each being connected to a respective one of said valves; and means to apply said first signal and a respective one of said second signals to the inputs of each of said control means, said control means serving to compare the signals applied thereto and establish output control signals to adjust respective ones of said valves.

2. The control system of claim 1 wherein each of said control means is a controller having a measured signal input, a set point input, and an output; and wherein said first signal is applied to the set point input of each of said controllers, and said second signals are applied to the measured signal inputs of respective ones of said controllers.

3. The control system of claim 1 wherein each of said control means is an adding relay.

4. In a process wherein a first fluid stream is divided into a plurality of second streams which are passed through a heat exchanger in parallel; a method of control which comprises measuring the rate of flow of said first stream and establishing a first signal representative thereof, individually measuring the temperatures of each of said second streams after they are passed through said heat exchanger and establishing a plurality of second signals representative of such measured temperatures, and individually controlling the rates of flow of each of said second streams in response to said first signal and respective ones of said second signals so as to tend to maintain said second signals equal.

5. The method of claim 4 wherein said first signal is added to each of said second signals individually to provide a plurality of third signals, and the rates of flow of said second streams are controlled in response to said third signals.

6. The method of claim 4 wherein the rates of flow of said second streams are controlled by the output signals of respective flow controllers, said first signal is applied to the set point of each of the flow controllers, and said second signals are applied as the measured inputs of respective ones of the flow controllers.

7. The process of claim 4 wherein said first stream is a crude oil and said heat exchanger is a heater.

References Cited

UNITED STATES PATENTS

| | | | |
|---|---|---|---|
| 2,323,180 | 5/1943 | Junkins | 122—448 |
| 2,664,245 | 12/1953 | O'Connor et al. | 236—23 X |
| 3,125,073 | 3/1964 | Profos | 122—379 |

FOREIGN PATENTS

| | | |
|---|---|---|
| 384,832 | 12/1932 | Great Britain. |
| 998,758 | 7/1965 | Great Britain. |

EDWARD J. MICHAEL, *Primary Examiner.*

U.S. Cl. X.R.

236—20